US008534377B2

(12) United States Patent
Berger et al.

(10) Patent No.: US 8,534,377 B2
(45) Date of Patent: Sep. 17, 2013

(54) PERCUSSIVE MECHANISM WITH AN ELECTRODYNAMIC LINEAR DRIVE

(75) Inventors: Rudolf Berger, Grunwald (DE); Otto W. Stenzel, Herrsching (DE); Wolfgang Schmid, Munich (DE)

(73) Assignee: Wacker Neuson Production GmbH & Co. KG, Munich (DE)

( * ) Notice: Subject to any disclaimer, the term of this patent is extended or adjusted under 35 U.S.C. 154(b) by 991 days.

(21) Appl. No.: 11/993,152

(22) PCT Filed: Jun. 28, 2006

(86) PCT No.: PCT/EP2006/006271
§ 371 (c)(1),
(2), (4) Date: Jun. 4, 2010

(87) PCT Pub. No.: WO2007/000344
PCT Pub. Date: Jan. 4, 2007

(65) Prior Publication Data

US 2010/0236802 A1 Sep. 23, 2010

(30) Foreign Application Priority Data

Jun. 29, 2005 (DE) ......................... 10 2005 030 340

(51) Int. Cl.
*B23B 45/16* (2006.01)
*B25D 9/00* (2006.01)
*B25D 11/00* (2006.01)
*B25D 13/00* (2006.01)
*B25D 16/00* (2006.01)

(52) U.S. Cl.
USPC ........................................... 173/204; 173/121

(58) Field of Classification Search
USPC ................. 173/118, 114, 117, 201–204, 121, 173/212
See application file for complete search history.

(56) References Cited

U.S. PATENT DOCUMENTS

| | | | | |
|---|---|---|---|---|
| 1,467,677 | A | 9/1923 | Lake | |
| 2,880,585 | A * | 4/1959 | Norman | 173/118 |
| 3,688,848 | A * | 9/1972 | Vick et al. | 173/201 |
| 3,835,935 | A * | 9/1974 | Sides et al. | 173/14 |
| 1,978,442 | A | 10/1974 | Taylor | |
| 4,201,269 | A * | 5/1980 | Ross | 173/1 |
| 4,290,492 | A * | 9/1981 | Sides et al. | 173/118 |
| 4,346,768 | A * | 8/1982 | Ross | 173/118 |
| 4,582,144 | A * | 4/1986 | Mizutani | 173/14 |
| 5,497,555 | A * | 3/1996 | Averbukh | 30/362 |
| 6,119,796 | A * | 9/2000 | Schmid | 173/201 |

(Continued)

FOREIGN PATENT DOCUMENTS

| | | | |
|---|---|---|---|
| DE | 2419164 | A1 | 7/1975 |
| DE | 2728485 | A1 | 1/1978 |

(Continued)

*Primary Examiner* — Robert Long
(74) *Attorney, Agent, or Firm* — Boyle Fredrickson, S.C.

(57) ABSTRACT

A percussive mechanism, which is provided in the form of an, e.g. pneumatic spring percussive mechanism, comprises an electrodynamic linear drive, a drive piston, which can be reciprocally moved inside a percussive mechanism housing by the linear drive, and a percussive piston. An additional hollow space is provided in front of and/or behind the drive piston and can be isolated at least in part from the surrounding area so that a pneumatic spring can be created in the additional hollow space. The pneumatic spring slows the drive piston at its returning points and facilitates a returning motion without loading the electrodynamic linear drive.

18 Claims, 8 Drawing Sheets

(56) References Cited

U.S. PATENT DOCUMENTS

| | | | | |
|---|---|---|---|---|
| 6,938,704 | B2 * | 9/2005 | Berger et al. | 173/201 |
| 7,025,183 | B2 * | 4/2006 | Steffen et al. | 188/267 |
| 7,096,973 | B2 * | 8/2006 | Ikuta et al. | 173/201 |
| 7,252,157 | B2 * | 8/2007 | Aoki | 173/162.2 |
| 7,861,799 | B2 * | 1/2011 | Iwakami et al. | 173/201 |
| 8,011,443 | B2 * | 9/2011 | Meixner et al. | 173/118 |
| 8,215,529 | B2 * | 7/2012 | Wu | 227/130 |
| 2003/0221847 | A1 * | 12/2003 | Funfer | 173/201 |
| 2006/0076154 | A1 * | 4/2006 | Aoki | 173/212 |
| 2008/0314608 | A1 * | 12/2008 | Berger et al. | 173/132 |
| 2010/0025061 | A1 * | 2/2010 | Meixner et al. | 173/118 |
| 2010/0300718 | A1 * | 12/2010 | Hartmann et al. | 173/201 |
| 2011/0127055 | A1 * | 6/2011 | Braun et al. | 173/117 |

FOREIGN PATENT DOCUMENTS

| | | | |
|---|---|---|---|
| DE | 10204861 | A1 | 8/2003 |
| SU | 1361321 | A | 12/1987 |
| SU | 1463909 | A | 3/1989 |

* cited by examiner

PERCUSSIVE MECHANISM WITH AN ELECTRODYNAMIC LINEAR DRIVE

BACKGROUND OF THE INVENTION

1. Field of the Invention

The present invention relates to a percussion mechanism having an electrodynamic linear drive.

2. Description of the Related Art

Drilling and/or striking hammers (designated "hammers" hereinafter) are standardly driven by electric motors in which a rotor rotates a drive shaft. The rotational movement is converted into an oscillating linear movement that is communicated to a drive element in a percussion mechanism. Here, as a percussion mechanism in particular a pneumatic spring mechanism is suitable in which a drive piston that acts as a drive element is moved back and forth.

From DE 102 04 861 A1, a pneumatic spring percussion mechanism is known for a hammer in which a drive piston is capable of being driven by an electrodynamic linear drive. The drive piston is coupled to a runner of the linear drive, so that the linear back-and-forth movement of the runner is transmitted to the drive piston. The movement of the drive piston is in turn transmitted (as is standard in pneumatic spring percussion mechanisms) via an air spring to a percussion piston that strikes the end of a tool or strikes an intermediately situated header in a known manner.

In a linear electromagnetic drive system of this sort, the runner and the drive piston coupled thereto must be braked when they reach their extreme positions in order to enable a change in the direction of movement. Only in this way is an oscillating percussive operation possible. During the braking, it, is possible to feed part of the kinetic energy back into an intermediate circuit as electrical energy. However, in the coils of the stator that surrounds the runner, heat loss occurs that has an adverse effect on the efficiency of the percussion system. In addition, the lost heat must be conducted away using a suitable cooling device.

It is therefore advantageous to intermediately store the kinetic energy of the drive unit made up of the runner and the drive piston in a spring, so that after the reversal of the direction of movement this energy is available for the countermovement, and supports the electromagnetic drive force of the linear drive.

From each of EP 0 718 075 A1 and DE 24 19 164 A1, an electrodynamic drive is known for a percussion mechanism in which a return movement of a percussion piston is received by a mechanical helical spring acting as an end stop. When the percussion piston moves forward again, the helical spring releases the stored energy and thus supports the forward or percussive movement. The described percussion mechanisms are however not pneumatic spring percussion mechanisms, and do not have any separation between a drive piston and a percussion piston.

In addition, helical springs have the disadvantage that they can break due to the high impact speeds. Also, significant vibration noise results. Moreover, if the helical spring is too weak, given a correspondingly high impact speed of the percussion piston the spring can bottom out, which can result in damage to the percussion mechanism.

DE 27 28 485 A1 indicates an electromagnetically operated percussion device in which a shaped piece that acts as a percussion tool is surrounded by a plunger that can be moved cyclically in the impact direction by an electromagnet. At the rear end of the percussion tool, a piston is provided that operates against a pneumatic damper.

From U.S. Pat. No. 1,467,677, an electric hammer is known in which a piston is actuated in alternating fashion by two electromagnets and is moved back and forth in this way. At one end of the piston there is situated a hardened steel tip that strikes a percussion tool. On the opposite side of the piston, an air spring is provided whose strength can be adjusted by opening and closing air ducts.

OBJECT OF THE INVENTION

The underlying object of the present invention is to indicate a percussion mechanism having an electrodynamic linear drive in which an electromagnetic drive force that is used to reverse the direction of movement of a linearly moved drive unit is supported without having to accept the disadvantages associated with other types of percussion mechanisms.

According to the present invention, this object is achieved by a percussion. A percussion mechanism according to the present invention has an electrodynamic linear drive, a drive element that can be moved back and forth in a percussion mechanism housing by the linear drive, a percussion element that strikes a tool, and a coupling, or a coupling device, that is effective between the drive element and the percussion element, via which the movement of the drive element is capable of being transmitted to the percussion element. According to the present invention, the percussion mechanism is characterized in that, seen in the direction of impact, a reversing hollow space is effectively provided before and/or after the drive element, and in that the reversing hollow space is capable of being separated at least at times from the surrounding environment, in such a way that in the reversing hollow space is capable of being separated at least at times from the surrounding environment, in such a way that in the reversing hollow space it is possible to produce a reversing air spring that acts against the drive element and/or against the percussion element.

Correspondingly, according to the present invention it is provided that an air spring can be produced in front of and/or behind the drive element during the operation of the percussion mechanism. This reversing air spring, as it is called, is charged, or "tensioned" or compressed, by the movement of the drive element when the drive element moves in, the direction of the air spring or of the reversing hollow space that accommodates the air spring. When there is a reversal of the linear movement of the drive element, the air pressure, then prevailing in the reversing air spring exerts a force on the drive element that supports the reversal of the direction of movement and accelerates the drive element in the opposite direction.

It is not absolutely necessary for the reversing air spring to actually be spatially situated axially in front of or behind the drive element. The actual location of the reversing air spring situated in the reversing hollow space is, rather, arbitrary. However, what is important is that the action of the force of the reversing air spring be capable of being transmitted to the drive element (or percussion element), or, conversely, that the charging of the reversing air spring by the drive element (percussion element) be possible.

Air spring systems have proven their usefulness in percussion mechanisms, and have a very high degree of reliability. If designed properly, they also have a high degree of efficiency. A complete compression of the air spring, and thus an impact stress on the solid-body components that are moved relative to one another and that form the hollow space, can be avoided due to the progressivity of the spring characteristic (especially in the end area). The constructive length of the reversing air spring can correspondingly be made shorter than is the case in linear metal spring systems (helical springs). In addition, air springs produce less sound. In a particularly advantageous specific embodiment of the present invention, the drive element is connected to a runner of the linear drive and forms an integrated drive unit with the runner. In particular, it is advantageous if the drive element bears the runner or is essentially completely formed by the runner, so that the runner simultaneously takes over the function of the drive element.

The linear motor can be a switched reluctance motor (SR motor), and has in the area of movement of the runner a plurality of drive coils (stators) that are connected in a manner corresponding to the desired movement of the drive element. It is to be noted that in the context of the present invention an electrodynamic drive (e.g. in the form of a single electromagnetic coil) acting as a drive coil for the drive element is also regarded as a linear motor. The backward movement of the drive element can then take place for example exclusively via a reversing air spring that can be produced in a reversing hollow space that is present in front of the drive element.

In a specific embodiment, the coupling device is formed by a stop that is effective between the drive element and the percussion element. Via the stop, the drive movement of the drive element can be transmitted directly to the percussion element. A variant is possible in which the coupling device is formed by two stops that move the percussion element back and forth corresponding to the movement of the drive element.

Preferably, the coupling device is formed as an elastic, in particular spring-elastic, element that is effective in at least one direction between the drive element and the percussion element. In this way, it is possible to reduce the noise emission and mechanical stresses on the relevant components. As an elastic element, a coupling air spring (explained in more detail below) can be used. Alternatively, the above-described stops can be supplemented by an elastic element or provided with an elastic layer in order to deploy a spring-elastic effect.

In a preferred specific embodiment, the reversing hollow space is situated at one end of the drive element, between the drive element and the percussion mechanism housing, in particular between the drive unit and the percussion mechanism housing. The reversing hollow space can correspondingly also be situated at one end of the runner coupled to the drive element. The situation at one end makes it possible for the reversing air spring that can be produced in the reversing hollow space to act immediately on the drive unit and thus on the drive element.

It is particularly advantageous that the reversing air spring that can be produced in the reversing hollow space counteracts at least at times a movement of the drive element. In this way, the drive element can compress or charge the reversing air spring during its movement. After a reversal of the direction of movement of the drive element, the reversing air spring releases its stored energy and supports the countermovement of the drive element.

Advantageously, the reversing air spring that can be produced in the reversing hollow space counteracts the movement of the drive element at least shortly before a reversal of direction of the drive element. In this way, the reversing air spring contributes to a braking of the drive element shortly before its reversal of direction. Depending on the dimensioning of the linear drive and of the reversing air spring, in some circumstances it is even possible in this way for a return movement of the drive element to be brought about solely by the reversing air spring, while the linear drive is switched off. Likewise, it is possible for the linear drive to control the return movement of the drive element with only low power. If necessary, for this purpose a sensor mechanism is to be provided that constantly determines the precise location of the drive element or of the runner and in this way monitors the action of the reversing air spring. With the aid of the sensor mechanism and a corresponding control unit, the linear drive can be controlled in such a way that the drive element and the runner follow a prespecified course of movement.

In a particularly preferred specific embodiment of the present invention, the reversing hollow space is a “first” hollow space that is provided in front of the drive element, a part of the percussive element passing through the first hollow space.

It is particularly advantageous if, alternatively or in addition to the first hollow space, a reversing hollow space is provided as a “second” hollow space behind the drive element, and, when there is a return movement, opposite to the direction of impact, of the drive element, the reversing air spring capable of being produced in the second hollow space is effective at least over a movement path of the drive element of greater than 30%, in particular greater than 50%, of the overall path of the return movement of the drive element.

Whereas above it was defined that a reversing hollow space is situated in front of the drive element as the “first hollow space,” the reversing hollow space behind the drive element is designated the “second hollow space.” These differing designations are intended only for clarification, and do not have any further meaning with respect to the functioning of the device. Both the first hollow space in front of the drive element and also the second hollow space behind the drive element act as “reversing hollow spaces” for accommodating a reversing air, spring that supports the respective reversal of direction of the drive element and the corresponding acceleration in the opposite direction. The first and the second hollow space can be provided in the percussion mechanism alternatively or together.

The relatively elongated effectiveness of the reversing air spring in the second hollow space means that the reversing air spring situated behind the drive element builds up over as long a path as possible, so that the drive unit has to exert force against this reversing air spring over almost its entire return path in order to compress this spring. While during the forward movement of the drive unit in the direction of impact it is sought to transmit as large a portion as possible of the drive energy to the percussion element, so that this portion of drive energy is available as impact energy, during the return movement of the drive unit there is a certain excess of energy, because during the return movement no impact is to be carried out. This excess of energy can now be used to charge the reversing air spring behind the drive element over as long a path as possible. The energy stored in the reversing air spring is then available for the next forward movement, and supports the effect of the linear drive for impact production. In this way, the linear drive can be made weaker, so that the power loss to be applied in the stator coils is also reduced.

The drive force produced by the coils is proportional to the current flowing through them, while the power loss in the coils is proportional to the square of the current. The impact or percussion energy is proportional to the product of the force times the path. If the path of the drive element is lengthened, the force that is to be produced by the linear drive, i.e. the stator coils, can be reduced in order to obtain the same energy effect. This increases the efficiency. Even if the air spring itself produces losses, the overall balance is positive compared to an electrical intermediate storage of the electrical braking energy in an intermediate circuit.

Preferably, there is provided a ventilation opening that can be closed at times between the reversing hollow space and the surrounding environment. Via the ventilation opening, it is possible to equalize the air between the reversing air spring in the reversing hollow space and the surrounding environment in order to compensate gap losses that necessarily occur during the compression phases.

Preferably, the ventilation opening is provided in the percussion mechanism housing in an area past which the drive element or drive unit travels during a percussion cycle. The opening and closing of the ventilation opening can in this way be immediately taken over by the drive element or drive unit itself, without requiring an additional control mechanism.

Correspondingly, it is particularly advantageous if the ventilation opening is capable of being opened or closed during a percussion cycle depending on the position of the drive element and/or of the drive unit.

A specific embodiment is particularly advantageous in which the percussion mechanism is realized as a pneumatic spring percussion mechanism. For this purpose, the drive element is fashioned as a drive piston and the percussion element is fashioned as a percussion piston. The coupling device is formed by a coupling air spring that acts in a coupling hollow space between the drive piston and the percussion piston. The coupling air spring ensures the transfer of energy from the drive piston to the percussion piston, and is responsible in a known manner for the designation "pneumatic spring percussion mechanism." Pneumatic spring percussion mechanisms are known from the prior art in many embodiments. However, according to the present invention what is new is the possibility of braking the drive piston and/or the percussion piston using the additional reversing air spring. The coupling air spring can also be regarded as a main air spring, because a significant part of the impact energy is transmitted by it.

In a particularly advantageous specific embodiment of the present invention, the drive piston essentially encloses the percussion piston. The percussion piston has a piston head, and, relative to the forward-directed direction of impact, the coupling hollow space having the coupling air spring for transmitting the impact energy to the percussion piston is situated behind the piston head. In front of the piston head, another hollow space for a return air spring is formed between the drive piston and the percussion piston. Such a hollow piston percussion mechanism having a double-action air spring is known. Accordingly, the drive piston has a hollow cavity in which the percussion piston can move back and forth. The return air spring ensures a controlled return movement of the percussion piston after the impact. In this way, the percussion piston is connected in an entrained manner to the movement of the drive piston in its return movement as well.

In order to permit formation of the hollow space for the return air spring in front of the piston head, it is necessary that the drive piston enclose the percussion piston not only in the rear area, i.e. in the area of the main air spring, but also in the front area in front of the piston head. Only a shaft of the percussion piston extending from the piston head can be led out from the drive piston.

In a preferred specific embodiment, the reversing air spring acts only against the drive piston, and not against the percussion piston. In this way, the percussion piston is freely movable and receives all of its kinetic energy via the coupling to the drive piston.

In another specific embodiment of the present invention, however, the reversing air spring additionally acts at least in a direction of movement of the percussion piston, or may even act only against the percussion piston. In this variant, in particular during its return movement the percussion piston can run against the reversing air spring and charge it, so that the reversing air spring, which is not coupled to the drive piston, supports the subsequent forward movement of the percussion piston.

In such a specific embodiment, it can be advantageous if the percussion piston is connected with a positive fit to a reversing piston, so that the reversing piston acts against the reversing air spring. It is then possible to situate the reversing air spring at a location remote from the percussion piston.

In another specific embodiment of the present invention, the reversing air spring acts at least at times axially against the drive element or against the percussion element, the reversing hollow space being provided in an area that is not situated axially to the drive element. For this reason, a transfer device is provided with which the drive element can be coupled non-positively to the reversing air spring formed in the reversing hollow space. The reversing hollow space can in this way be situated for example laterally next to the drive element or in another area of the percussion mechanism or of the hammer driven thereby.

This specific embodiment enables the free situation of the reversing air spring at a location at which there is suitable space for it. Thus, the reversing hollow space with the reversing air spring can for example be situated, next to the drive element.

These and additional advantages and features of the present invention are explained in more detail below on the basis of examples, with the aid of the accompanying Figures.

DETAILED DESCRIPTION OF THE PREFERRED EMBODIMENT

FIGS. 1 to 3 and 4 to 6 show two different specific embodiments of the percussion mechanism according to the present invention, realized as a pneumatic spring percussion mechanism, in a highly simplified schematic representation. In particular, known components such as electrical terminals and sensors are omitted because they do not relate to the present invention. The percussion mechanism according to the present invention can be used particularly advantageously in a drilling and/or striking hammer. Here, various types of percussion mechanism can be realized, of which in particular pneumatic spring percussion mechanisms are particularly suitable.

Figure 1:
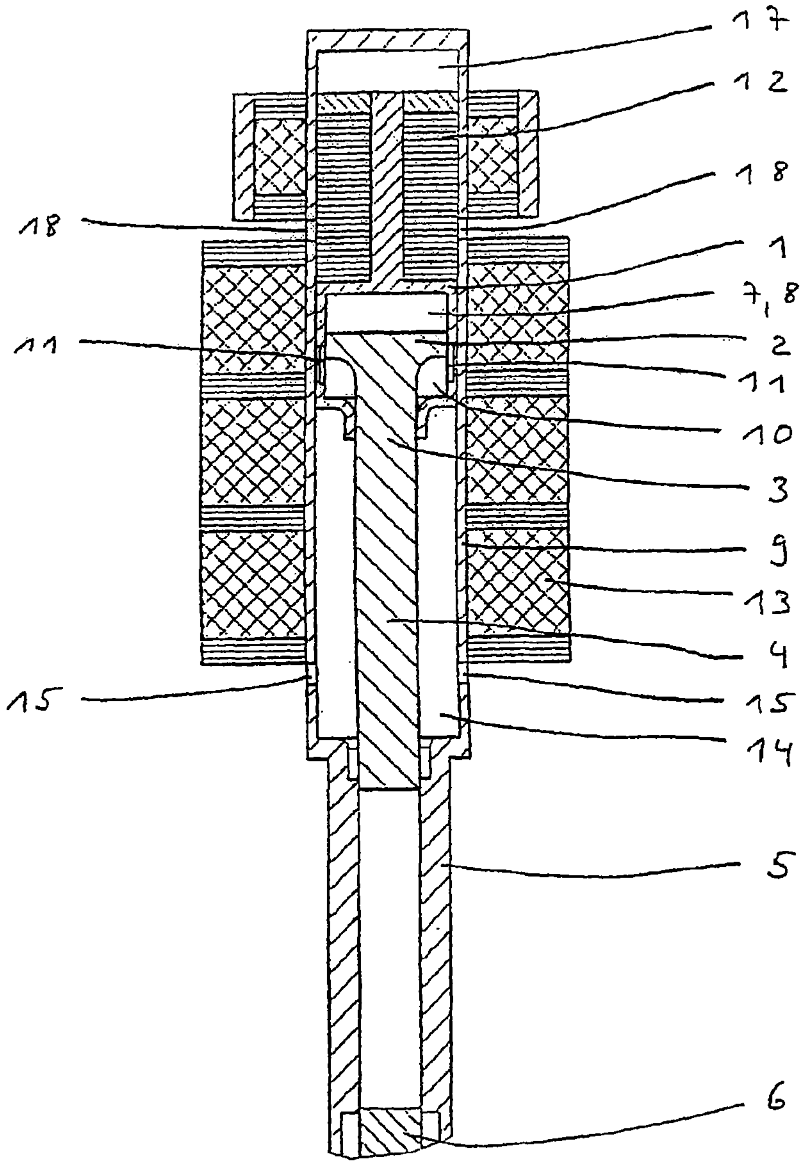
FIG. 1 shows a schematic view of a section through a percussion mechanism, realized as a pneumatic spring percussion mechanism, according to a first specific embodiment of the present invention, having a drive unit in the extreme rear position.
Figure 2:
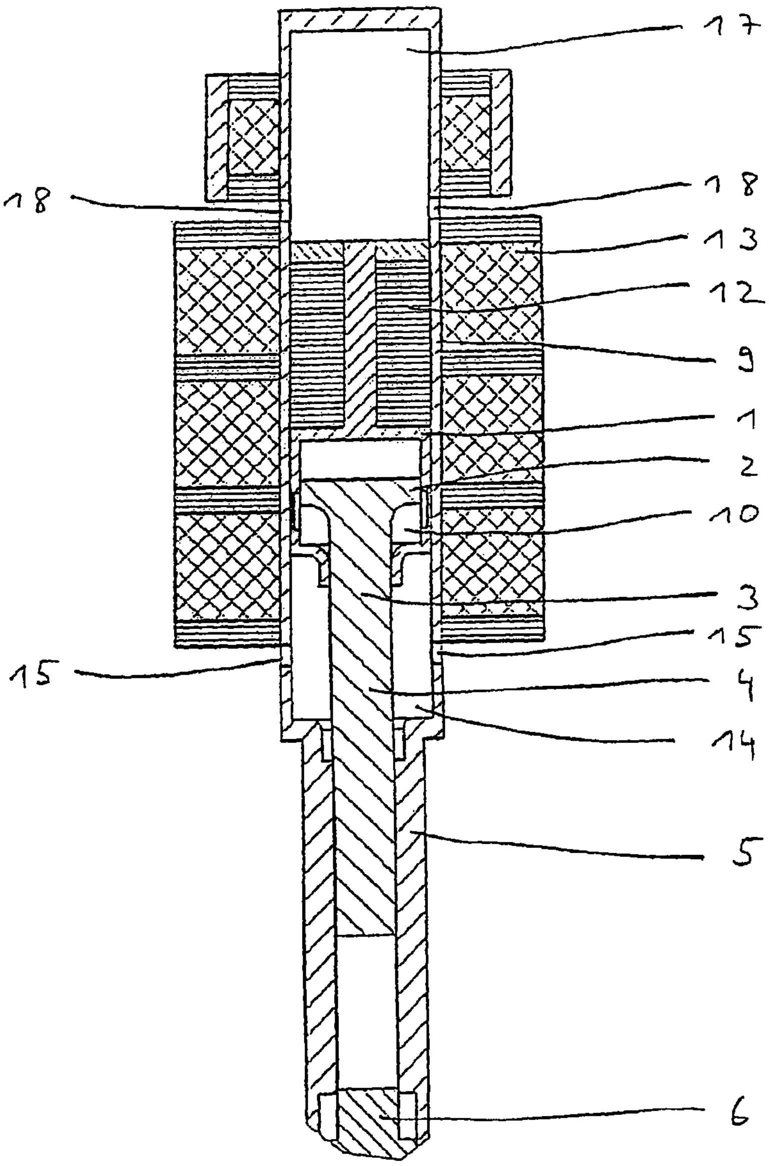
FIG. 2 shows the pneumatic spring percussion mechanism of FIG. 1 with the drive unit in the center position.
Figure 3:
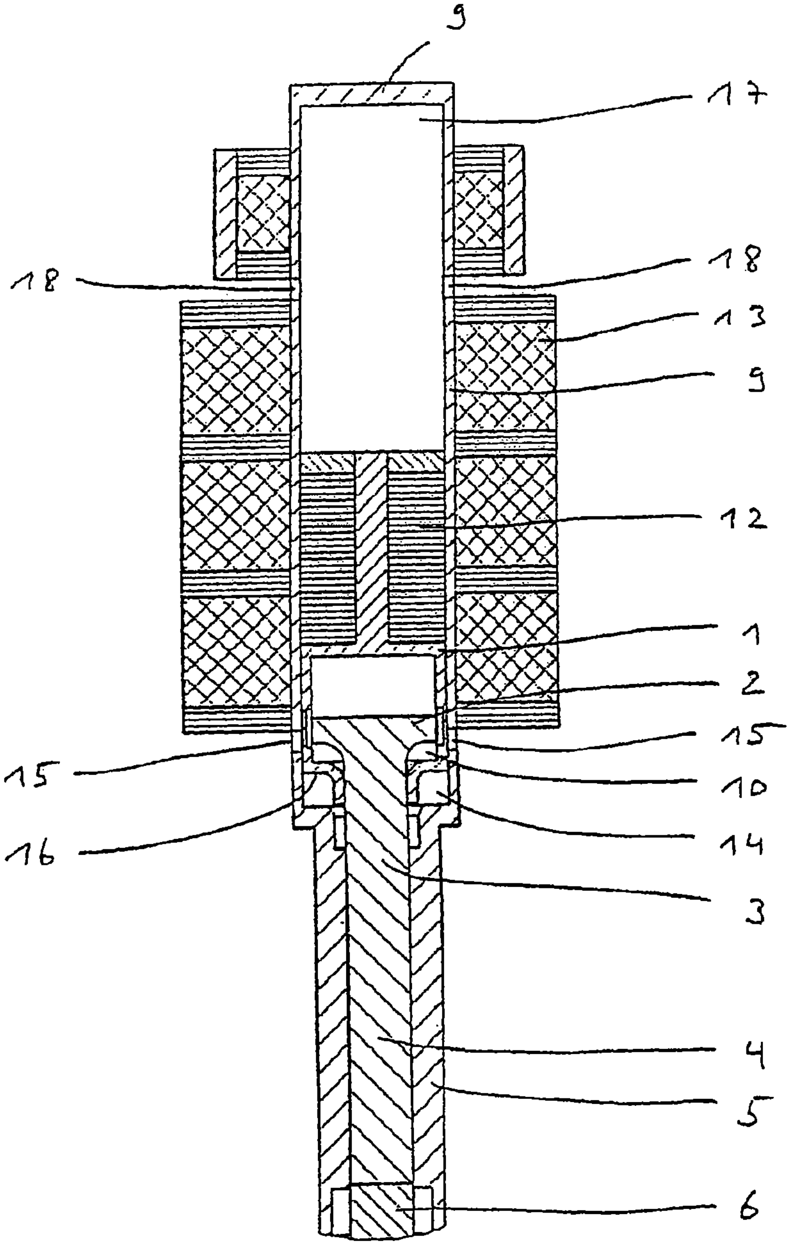
FIG. 3 shows the pneumatic spring percussion mechanism of FIG. 1 with the drive unit in the extreme front position.

FIGS. 1 to 3 show a first specific embodiment of the present invention having a pneumatic spring percussion mechanism driven by an electrodynamic linear drive. Here, a drive unit (explained in more detail below) is shown in the representation in FIG. 1 in an extreme upper/rear position; in FIG. 2 is shown in a center position and in FIG. 3 it is shown in an extreme lower/front position.

The pneumatic spring percussion mechanism has a drive piston 1 that surrounds a piston head 2 of a percussion piston 3. A shaft 4 of percussion piston 3 extends through a front side of drive piston 1 into a percussion piston guide 5, and in its frontmost position can strike a tool end 6, as is shown in FIG. 3. Instead of tool end 6, in a known manner an intermediate header can also be provided.

Between drive piston 1 and percussion piston 3 there is formed a first hollow space 7, in which a main pneumatic spring 8 acts. When there is a forward movement of drive piston 1, which is capable of axial back-and-forth movement in a percussion mechanism housing 9, a pressure builds up in main pneumatic spring 8 that drives percussion piston 3 forward, so that it can finally strike against tool end 6.

When there is a return movement of drive piston 1, a partial vacuum arises in main pneumatic spring 8 that suctions back percussion piston 3 with its piston head 2. The return movement of percussion piston 3 is also supported by the impact reaction at tool end 6. In addition, seen in the direction of impact, in front of piston head 2 a return pneumatic spring 10 is formed in another hollow space, and this return spring acts during the return movement of drive piston 1. It also supports the return movement of percussion piston 3.

In order to compensate air losses in pneumatic springs 8, 10, a plurality of air compensation pockets 11 are provided on the inner wall of drive piston 1. Their functioning is known from the prior art, so that a more detailed description is not necessary here. Instead of air compensation pockets 11, other air ducts are also known that enable ventilation of pneumatic springs 8, 10 in order to enable the compensation of air losses caused by compression.

The oscillating linear back-and-forth movement of drive piston 1 is brought about by an electrodynamic linear drive. For this purpose, drive piston 1 is coupled to a runner 12 of the linear drive. Runner 12 can be formed by a plurality of electrical sheets layered one over the other, and is moved back and forth by alternating magnetic fields produced by a stator 13 of the linear drive. The functioning of such a linear drive is known and is described for example in DE 102 04 861 A1. The linear motor can be for example a reluctance motor having an externally situated stator.

Runner 12 and drive piston 1 than a one-piece drive unit.

In front of drive piston 1, an additional, second hollow space 14 is formed between drive piston 1 and percussion mechanism housing 9; in the positions shown in FIGS. 1 and 2, this hollow space 14 is connected to the surrounding environment via ventilation openings 15.

In the position of the drive unit shown in FIG. 3, runner 12 has moved drive piston 1 forward far enough that drive piston 1 has moved past ventilation openings 15. This causes ventilation openings 15 to be sealed, so that second hollow space 14 is separated from the surrounding environment. Correspondingly, an air spring forms in second hollow space 14 that acts against drive piston 1 and brakes its movement in the forward or impact direction.

So that the pneumatic spring can be produced in second hollow space 14 in a suitable manner, and in particular does not act against percussion piston 3, which is supposed to strike tool end 6 in as unhindered a manner as possible, drive piston 1 forms a piston surface 16 at its front side. Piston surface 16 compresses the pneumatic spring in second hollow space 14.

Depending on the dimensioning, it is possible for stator 13 to be switched currentless at the time at which ventilation opening 15 is closed by drive piston 1. The braking of the drive unit made up of drive piston 1 and runner 12 then takes place exclusively through the pneumatic spring in second hollow space 14. Because the compressed pneumatic spring then has a tendency to decompress, it additionally presses the drive unit back against the direction of impact. Then, as needed, stator 13 can again be excited in order to support the return movement.

The air spring in second hollow space 14 should be positioned or dimensioned in such a way that the drive unit is caught at the lower reverse point before percussion piston 3 strikes tool end 6.

Corresponding to the air spring in second hollow space 14, on the opposite side, behind drive piston 1 or behind the overall drive unit, there is formed a third hollow space 17 between drive piston 1, or the drive unit, and percussion mechanism housing 9. Percussion mechanism housing 9 is however shown only schematically in the Figures. Of course, percussion mechanism housing 9 can be assembled from various components, or can have a construction differing from that shown in the Figures.

In the positions shown in FIGS. 2 and 3, third hollow space 17 stands in communicating connection to the surrounding environment via ventilation openings 18.

In contrast, in the position shown in FIG. 1 the drive unit has, passed over ventilation openings 18 and thus closed them. Correspondingly, third hollow space 17 is separated from the surrounding environment, so that an air spring can build up in this hollow space, as is shown in particular in FIG. 1. This air spring brakes the movement of the drive unit during its return stroke. Depending on the dimensioning, the air spring in third hollow space 17 can be strong enough to completely brake the return stroke and to convert it into a counter-movement, namely a movement in the impact direction. Here as well, stator 13, in a manner similar to the functioning of the air spring in second hollow space 14, can be switched off, or switched on only as needed.

The air spring in third hollow space 17 should be made as long as possible so that it is compressed over a longer movement path of the drive unit. During the return stroke of the drive unit, in comparison to the impact stroke, relatively little energy is required, which can then be stored in the air spring in third hollow space 17. The stored energy is subsequently available during the forward movement of drive piston 1 in order to move this piston against percussion piston 3. The energy stored in the air spring of third hollow space 17 thus supports the linear drive, which can then either correspondingly be dimensioned more weakly, or together with which a significantly higher impact energy can be achieved.

Figure 4:
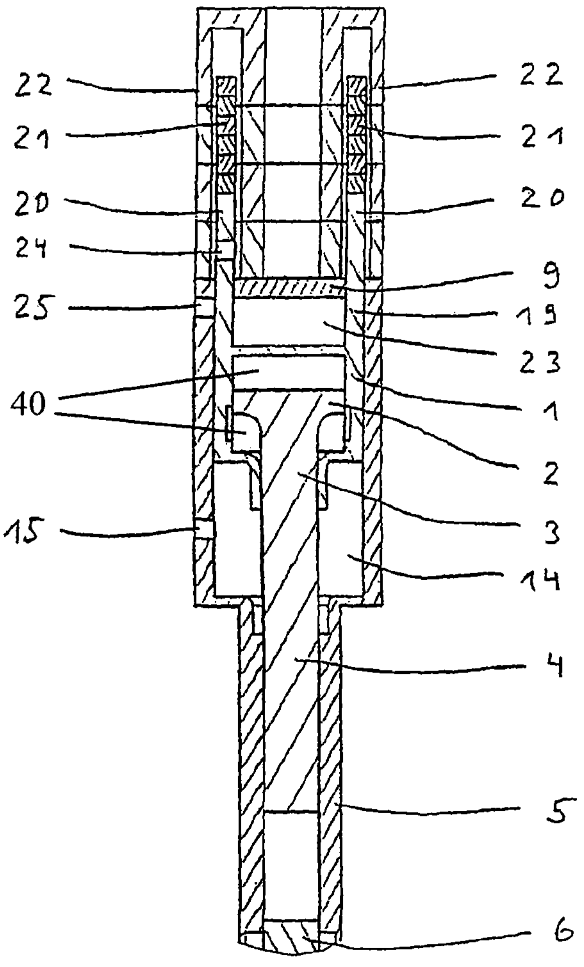
FIG. 4 shows a schematic view of a section through a percussion mechanism, realized as a pneumatic spring percussion mechanism, according to a second specific embodiment of the present invention, having a drive unit in the extreme rear position.
Figure 5:
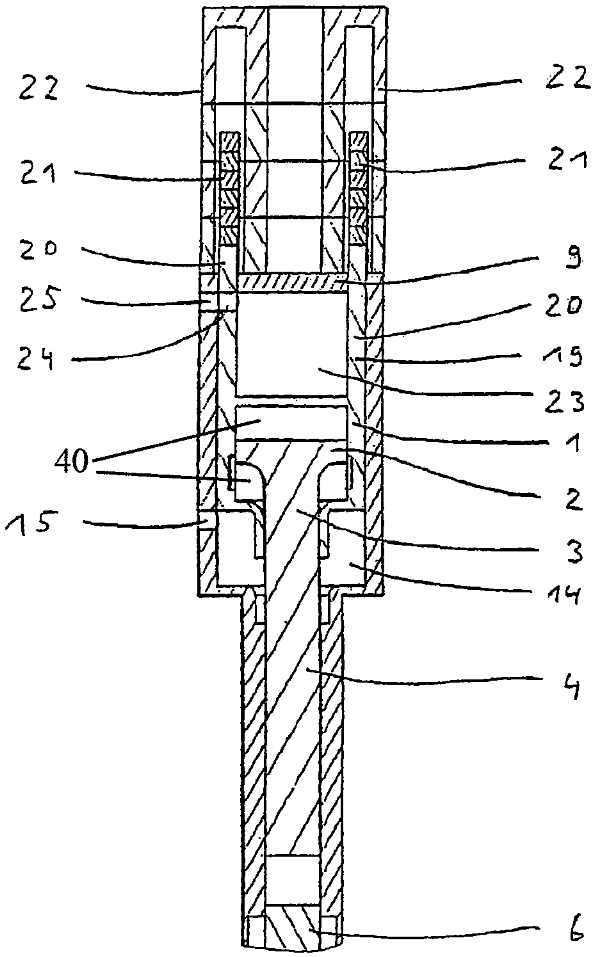
FIG. 5 shows the pneumatic spring percussion mechanism of FIG. 4 with the drive unit in the center position.
Figure 6:
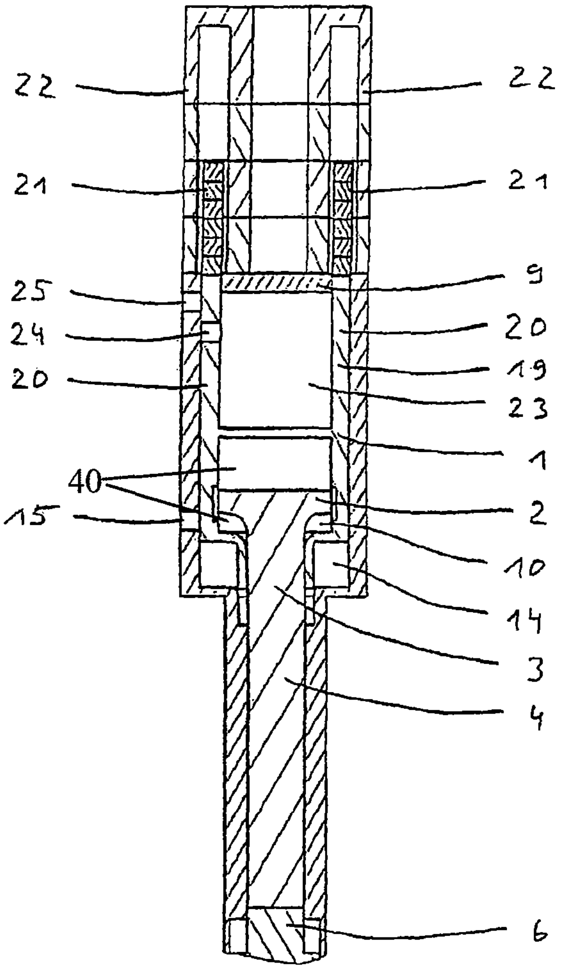
FIG. 6 shows the pneumatic spring percussion mechanism of FIG. 4 with the drive unit in the extreme front position.

FIGS. 4 to 6 show a second specific embodiment of the present invention which differs from the first specific embodiment shown in FIGS. 1 to 3 with respect to the construction of the electrodynamic linear drive. Identical components are designated by identical reference characters. FIG. 4 shows the drive unit in an extreme upper/rear position, FIG. 5 shows it in a center position, and FIG. 6 shows it in an extreme lower/front position.

Such a linear drive can be realized for example by a magnetic motor.

Drive piston 1 has a runner 19 in the form of two sword-shaped or disk-shaped extensions 20. Rare earth magnets 21 are fastened to extensions 20, and these magnets can each be moved back and forth in a stator 22.

Alternatively, in another specific embodiment (not shown) of the present invention, runner 19 can be provided with an annular extension that can be moved in an annular stator.

Behind drive piston 1, in cooperation with percussion mechanism housing 9 a third hollow space 23 is formed in which an air spring 40 can be produced. As explained above, the concept "percussion mechanism housing" 9 is to be understood broadly. What is important is that in cooperation with drive piston 1 or the drive unit made up of drive piston 1 and runner 19, a hollow space can be produced in which an air spring 40 can form.

In runner 19, a ventilation opening 24 is formed that, in the position shown in FIG. 5, covers a ventilation opening 25 present in percussion mechanism housing 9, so that air can flow from the surrounding environment into third hollow space 23, in order to restore the air previously lost during the compression of the air spring 40. In the positions shown in FIGS. 4 and 6, ventilation openings 24 and 25 are not positioned one over the other, so that third hollow space 23 is separated from the surrounding environment.

The cooperation of drive piston 1 and percussion piston 3, as well as the functioning of second hollow space 14, corresponds to the first specific embodiment, so that the description thereof is not repeated here.

Figure 7:
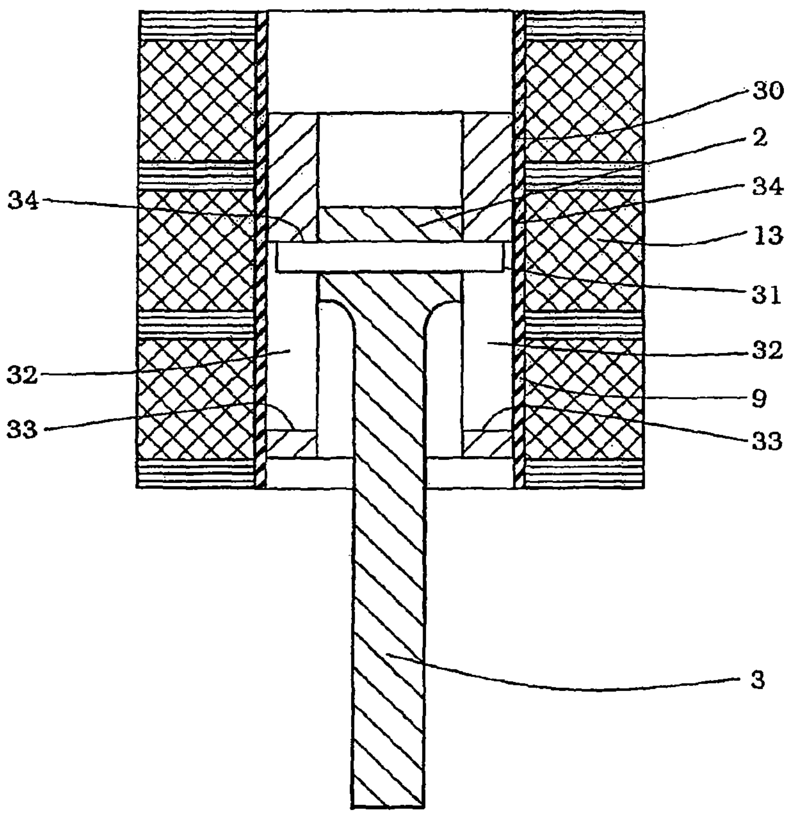
FIG. 7 shows a schematic view of a section through a percussion mechanism according to a third specific embodiment of the present invention.

FIG. 7 shows a schematic section through a third specific embodiment of the present invention. In contrast to the pneumatic spring percussion mechanisms described above on the basis of FIGS. 1 to 6, the third specific embodiment according to FIG. 7 relates to a percussion mechanism in which the energy for the percussion movement cannot be transmitted by an air spring. Correspondingly, this percussion mechanism cannot be designated a pneumatic spring percussion mechanism.

The percussion mechanism is driven by an electrodynamic linear drive, in a manner similar to the above-described pneumatic spring percussion mechanisms. It has a drive unit 30 that combines the functions of a drive element and a runner of the linear drive. Drive unit 30 is shown only schematically in FIG. 7. Thus, for example the construction of the runner is not shown in detail. However, the details described above relating to runner 12 (FIG. 1) or runner 19 (FIG. 4) hold here as well.

Analogously to the above description, drive unit 30 is capable of being moved back and forth in a tube-shaped percussion mechanism housing 9, the movement being brought about by stator 13.

Drive unit 30 has a sleeve-shaped construction, and has in its interior a hollow area in which percussion piston 3, which forms a percussion element, is capable of being moved back and forth. Percussion piston 3 then strikes the tool (not shown in FIG. 7) in a known manner.

In order to transfer the movement of drive unit 3 to percussion piston 3, a coupling device is provided. The coupling device has a catch 31, carried by percussion piston 3, in particular by piston head 2 of percussion piston 3, that can be moved back and forth in recesses of drive unit 30 in the working direction of the percussion mechanism. Catch 31 can for example be formed by a cross-bolt that passes through piston head 2 of percussion piston 3, as is shown in FIG. 7.

The recesses in drive unit 30 are formed by two longitudinal grooves 32 that extend axially and that pass through the wall of hollow cylindrical drive unit 30.

On the front sides of longitudinal grooves 32, lower stops 33 and upper stops 34 are formed that limit the longitudinal motion of catch 31 in longitudinal grooves 32.

When there is a back-and-forth movement of drive unit 30, percussion piston 3 is thus coercively guided by the respective stops 33, 34, as well as by catch 31. Given a forward movement of drive unit 30 (downward in FIG. 7) in the direction of the tool (working direction), upper stops 34 press catch 31 with percussion piston 3 downward, such that percussion piston 3 should be able to fly free shortly before contacting the tool or the intermediately situated header, in order to avoid damaging effects on drive unit 30 and catch 31. In the subsequent return movement of drive unit 30, lower stops 33 come into contact with catch 31 and draw back percussion piston 3, which is also driven back by the tool, in the direction opposite the working direction. The working cycle then repeats in that drive unit 30, with upper stops 34, again accelerates percussion piston 3 against the tool.

In this specific embodiment, the coupling device is thus not formed by an air spring, but rather by longitudinal grooves 32, stops 33, 34, and catch 31. Of course, the described design serves only for explanation. Numerous other possibilities will be recognized by those skilled in the art for the transfer of the movement of drive unit 30 to percussion piston 3.

Figure 8:
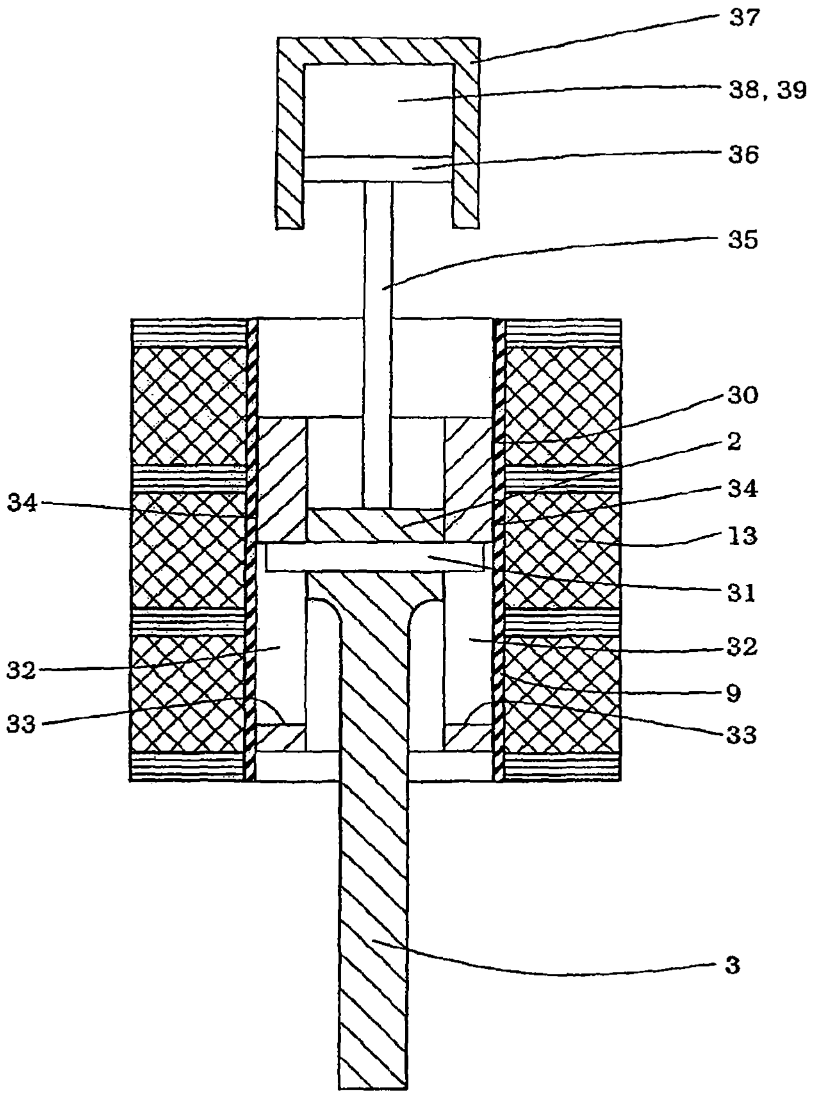
FIG. 8 shows a schematic representation of a section through a percussion mechanism according to a fourth specific embodiment of the present invention.

FIG. 8 shows, in a schematic representation, a section through a percussion mechanism according to a fourth specific embodiment of the present invention.

Here, the basic design of the percussion mechanism is identical to that of the percussion mechanism according to FIG. 7. In addition, piston head 2 of percussion piston 3 is coupled with a positive fit to a reversing piston 36 via a piston rod 35. Reversing piston 36 is capable of being moved back and forth in a reversing cylinder 37, which is for example part of percussion mechanism housing 9, in a manner corresponding to the movement of percussion piston 3.

Reversing piston 36 and reversing cylinder 37 enclose a reversing hollow space 38 in which a reversing air spring 39 is formed.

Similar to the manner in which, in the first specific embodiment shown in FIGS. 1 to 3, the reversing air spring in reversing hollow space 17 brakes a return movement of drive piston 1 depicted there, and later supports a forward movement, the reversing air spring 39 shown in FIG. 7 is tensioned when there is a return movement of percussion piston 3, so that this air spring can subsequently support a forward movement of percussion piston 3.

The compensation of air losses of reversing air spring 39 takes place in a manner similar to that in the above-described specific embodiments, so that a detailed description can be omitted here.

For reversing air spring 39 as well, it can be particularly useful if it is charged over a longer movement path of percussion piston 3. In the fourth specific embodiment shown in FIG. 8, the compressing of reversing air spring 39 takes place in a particularly reliable fashion, because the entrained movement of percussion piston 3 is achieved through the positive coupling, brought about by the coupling device, between drive unit 30 and percussion piston 3.

The present invention makes it possible to increase the degree of efficiency of a linearly driven electrodynamic percussion mechanism. Through the intermediate storage of energy in the air springs, a more uniform electrical power consumption with low load peaks can be achieved. Moreover, impact-type loads on the hammer housing at the reverse points of the drive unit are avoided. The percussion mechanism according to the present invention can achieve greater demolition performance with a simultaneous reduction in hand-arm vibrations.

The invention claimed is:

1. A coupling for a percussion mechanism with an electrodynamic linear drive; a drive element that is capable of being moved back and forth in a percussion mechanism housing by the linear drive, and a percussion element for striking a tool, the percussion element being capable of being moved relative to the drive element, the coupling comprising:

a coupling that acts between the drive element and the percussion element, via which the movement of the drive element can be transferred to the percussion element; wherein, between the drive element and the percussion mechanism housing in the direction of impact, a reversing hollow space is provided at least one of in front of and/or behind the drive element; and wherein the reversing hollow space can be separated from ambient air external to the reversing hollow space in such a way that a reversing air spring that acts against at least one of the drive element and the percussion element is produced in the reversing hollow space; and wherein the coupling has an elastic element between the drive element and the percussion element.

2. The coupling as recited in claim 1, wherein the drive element is connected to a runner of the linear drive and forms a drive unit with the runner.

3. The coupling as recited in claim 1, wherein the reversing hollow space is situated proximate the drive element, between the drive unit and the percussion mechanism housing.

4. The coupling as recited in claim 1, wherein the reversing air spring can counteract a movement of the drive element.

5. The coupling as recited in claim 1, wherein the reversing air spring counteracts the movement of the drive element, at least before a reversal of direction of the drive element.

6. The coupling as recited in claim 1, wherein the reversing hollow space is a first hollow space situated in front of the drive element; and wherein the first hollow space is penetrated by a part of the percussion element.

7. The coupling as recited in claim 1, wherein the reversing hollow space is a second hollow space situated behind the drive element; and wherein the air spring functions over a greater than 50% of the overall return movement path of the drive element.

8. The coupling as recited in claim 1, wherein a ventilation opening is provided between the reversing hollow space and the surrounding environment and is capable of being closed.

9. The coupling as recited in claim 8, wherein the ventilation opening is provided in an area past which the drive element or the drive unit travels during a percussion cycle.

10. The coupling as recited in claim 8, wherein the ventilation opening is capable of being opened or closed during a percussion cycle, depending on the position of at least one of the drive element and the drive unit.

11. The coupling as recited in claim 1, wherein the percussion mechanism is a pneumatic spring percussion mechanism;

the drive element is a drive piston;

the percussion element is a percussion piston; and wherein the coupling comprises a coupling air spring that is effective in a coupling hollow space between the drive piston and the percussion piston.

12. The coupling as recited in claim 11, wherein the drive piston at least surrounds the percussion piston;

the percussion piston has a piston head;

relative to the direction of impact, the coupling hollow space with the coupling air spring is situated behind the piston head; and wherein another hollow space for a return air spring is formed in front of the piston head, between the drive piston and the percussion piston.

13. The coupling as recited in claim 11, wherein the reversing air spring acts only against the drive piston.

14. The coupling as recited in claim 11, wherein the reversing air spring acts only against the percussion piston, at least in one direction of movement of the percussion piston.

15. The coupling as recited in claim 11, wherein the percussion piston is connected to a reversing piston; and wherein the reversing piston acts against the reversing air spring.

16. The coupling as recited in claim 1, wherein the reversing air spring can act axially against the drive element and against the percussion element;

the reversing hollow space is not situated axially to the drive element; and wherein a transfer device is provided for the coupling of the drive element to the reversing air spring.

17. The coupling as recited in claim 13, wherein the percussion piston is connected to a reversing piston; and wherein the reversing piston acts against the reversing air spring.

18. The coupling as recited in claim 1, wherein the reversing air spring can act axially against the drive element and against the percussion element;

the reversing hollow space is not situated axially to the drive element; and wherein a transfer device is provided for coupling the drive element to the reversing air spring.

* * * * *